US006912632B2

(12) United States Patent
Mori

(10) Patent No.: US 6,912,632 B2
(45) Date of Patent: Jun. 28, 2005

(54) STORAGE SYSTEM, STORAGE SYSTEM CONTROL METHOD, AND STORAGE MEDIUM HAVING PROGRAM RECORDED THEREON

(75) Inventor: Akihiro Mori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 10/643,624

(22) Filed: Aug. 18, 2003

(65) Prior Publication Data

US 2004/0107325 A1 Jun. 3, 2004

(30) Foreign Application Priority Data

Oct. 15, 2002 (JP) ........................................ 2002-300789

(51) Int. Cl.[7] .............................................. G06F 12/00
(52) U.S. Cl. ...................... 711/162; 711/156; 711/161; 707/202; 707/204; 714/6; 714/13
(58) Field of Search ................................ 711/156, 161, 711/162; 707/202, 204; 714/6, 13

(56) References Cited

U.S. PATENT DOCUMENTS

| 6,119,131 | A | 9/2000 | Cabrera et al. | |
|---|---|---|---|---|
| 6,216,202 | B1 | 4/2001 | D'Errico | |
| 6,442,551 | B1 | 8/2002 | Ofek | |
| 6,557,089 | B1 * | 4/2003 | Reed et al. | 711/162 |
| 6,631,477 | B1 | 10/2003 | LeCrone et al. | |
| 6,681,303 | B1 | 1/2004 | Watanabe et al. | |
| 6,836,830 | B1 * | 12/2004 | Yamagami et al. | 711/162 |
| 2004/0205391 | A1 * | 10/2004 | Thompson | 714/13 |

FOREIGN PATENT DOCUMENTS

JP 2000-339104 12/2000

\* cited by examiner

*Primary Examiner*—Donald Sparks
*Assistant Examiner*—Ngoc V Dinh
(74) *Attorney, Agent, or Firm*—Townsend and Townsend and Crew LLP

(57) ABSTRACT

A storage system has a host computer and a storage control device connected thereto. The system controls duplication of data in a first logical volume to be stored in real-time in a second logical volume different therefrom, and makes a logical volume identifier and a data set identifier for the first volume described in the first volume's management information and a logical volume identifier and a data set identifier for the second volume described in the second volume's management information match during the duplication. The system generates a control program for setting the first volume's logical volume identifier and data set identifier in the first volume's management information and the second volume's logical volume identifier and data set identifier in the second volume's management information to differ and, by executing this program, makes the second volume be recognized by an OS as a volume independent of the first volume.

10 Claims, 10 Drawing Sheets

```
//SYSIN DD *
   CATALOG(CATALOG1,CATALOG2)      ···designate catalog name(s) used for recording
   CHGVOL(LVD001,LVD002)           ···designate volume name(s) to be changed
   CHGDSN(LVD.VSAM,DBD.VSAM)       ···designate data set name(s) to be changed
//
```

FIG. 7

```
//SYSIN DD *
   CATALOG(CATALOG1)               ···designate catalog name(s) used for recording
   CHGVOL(LVD001,LVD002)           ···designate volume name(s) to be changed
   CHGDSN(LVD.VSAM,DBD.VSAM1)      ···designate data set name(s) to be changed
//
```

FIG. 8

```
//SYSIN DD *
   CATALOG (CATALOG1)
   CATALOG (CATALOG2)
   CATALOG (CATALOG1, CATALOG3)
   CATALOG (CATALOG2, CATALOG4)
   CHGVOL (LVD001, LVD002)
   CHGDSN (LVD.VSAM, DBD.VSAM)
   RECAT (CATALOG1, CATALOG1, LVD.VSAM1) ...designate
        catalog information for before and after change and data set information for before change
   RECAT (CATALOG1, CATALOG3, LVD.VSAM2)
   RECAT (CATALOG2, CATALOG2, LVD.VSAM3)
   RECAT (CATALOG2, CATALOG4, LVD.VSAM4)
//
```

FIG. 9

STORAGE SYSTEM, STORAGE SYSTEM CONTROL METHOD, AND STORAGE MEDIUM HAVING PROGRAM RECORDED THEREON

CROSS-REFERENCE TO RELATED APPLICATIONS

The present application claims priority upon Japanese Patent Application No. 2002-300789 filed Oct. 15, 2002, which is herein incorporated by reference.

BACKGROUND OF THE INVENTION

1. Field of the Invention

The present invention relates to a storage system, a method of controlling a storage system, and a storage medium having a control program recorded thereon.

2. Description of Related Art

In a storage system including a host computer and a disk array device connected with each other so that they can communicate, there is known a duplication management function which enables duplication of data among logical volumes according to real-time copying.

The duplication management function will be described with reference to FIG. 11A through FIG. 11D. In FIG. 11A, a logical volume 71 ("primary logical volume" hereinbelow) formed on physical storage areas provided by disk drives 25, which serve as storage devices, is a logical volume that can be directly accessed from an operating system 12 ("OS" hereinbelow) running on a host computer 10.

On the other hand, another logical volume 72 ("secondary logical volume" hereinbelow) stores a duplicate of the data stored in the primary logical volume 71 by means of the duplication management function of the storage system.

In response to, for example, an instruction from the user, the duplication management function makes the control state of the primary logical volume 71 and the secondary logical volume 72 change between the "paired state" and the "split state". In the "paired state", when the contents of the primary logical volume 71 is updated, the contents of the secondary logical volume 72 will also be updated in a real-time basis so as to ensure consistency between the contents of the primary logical volume 71 and that of the secondary logical volume 72. Note that in the "paired state", access from another host computer 100 other than the host computer 10 to the secondary logical volume 72 is prohibited.

The "paired state" is cancelled, for example, when a pair split command sent from the host computer 10 by the user's instruction is received by the disk array device 20, and according to this command, the control state of the primary logical volume 71 and the secondary logical volume 72 is changed to the "split state" (see FIG. 11B). In the "split state," the other host computer 100, which was prohibited to access the secondary logical volume 72, will be allowed to access this secondary volume 72. The other computer 100 will be able to access the secondary logical volume 72 during the "split state" in order to backup data, perform batch processing or data analysis, and so forth. Note that in the "split state," any update to the primary logical volume 71 from the host computer 10 will not be reflected to the secondary logical volume 72.

In usual operation, data that has not been reflected to the secondary logical volume 72 and that has been generated by updating in the primary logical volume 71 is stored as "differential data." This differential data is to be used to make the contents of the secondary volume 72 consistent with the primary volume 71 prior to returning to the "paired state", as will be described later.

When a command to return from the "split state" to the "paired state" (such a command is referred to as a "resync command" hereinbelow) is issued from the host computer 10 to the disk array device 20, the duplication management function will synchronize the contents of both volumes 71, 72 (resync in progress) using the differential data, and then cause transition of the control state of primary logical volume 71 and secondary logical volume 72 to the "paired state".

As described above, the secondary logical volume 72 in the "split state" may be accessed from an OS 102 running on the host computer 100, and the computer 100 may make use of data in the secondary logical volume 72 to backup data, perform any batch operation or data analysis, and so forth.

During the "split state", however, the host computer 10, which accesses the primary logical volume 71, may not have access to the secondary logical volume 72 as an independent volume separate from the primary logical volume 71. This is because the OS 12 running on the host computer 10 stores identical logical volume names and data set names in the management information for the primary logical volume 71 and the secondary logical volume 72 that is managed by the duplication management function.

The management information may include VTOC (Volume Table of Contents), catalog information, VSAM (Virtual Storage Access Method) data set, and VVDS (Vsam Volume Data Set) that is the information about the data set of the target of system management, if the OS 12 is one for a mainframe. The management information may be the file system management information if the OS 12 is one for an open system.

From the point of view of, for example, attempting to increase performance and decrease cost for a host computer 10, there exists a need to make the secondary logical volume 72 accessible as a logical volume independent of the primary logical volume 71 from the host computer 10, which manages both the primary and secondary logical volumes 71, 72, and not only from the other computer 100.

In order to make the secondary logical volume 72 accessible as a logical volume independent of the primary logical volume 71, it may be sufficient to configure the logical volume names and data set names described in the management information for the primary logical volume 71 and management information for the secondary logical volume 72 to be different from each other.

Such a technology is known in the art and disclosed, for example, in Japanese Patent Application Laid-open Publication No. 2000-339104.

However, in general, the volume names and data set names are described in a number of locations in the management information. It is very cumbersome to perform settings for each data by using an editor, a tool, etc., and in addition, a human error might occur during the setting. It is not practical to perform setting for volume identifiers and data set identifiers every time a routine job, such as a daily data backup, a daily batch processing, and data analysis, is performed at a regular or irregular interval.

BRIEF SUMMARY OF THE INVENTION

The present invention has been made in view of the above circumstances and has an object to provide a method of controlling a storage system, a storage system, and a storage medium having a control program recorded thereon.

An aspect of the storage system of the present invention for achieving the above object is as follows:

The storage system has a storage control device connected to a host computer to be able to communicate therewith for controlling the data input/output (I/O) to/from a storage device according to a data I/O request sent from the host computer.

The storage control device manages a storage area in the storage device using a logical volume that is a logical storage area created on the storage area.

The system stores, in the logical volume, management information that enables an operating system running on the host computer to manage the logical volume.

The storage control device controls duplication of data in a first logical volume also to be stored on a real-time basis (in synchronism) in a second logical volume that is different from the first logical volume.

During synchronized (real-time) duplication, a logical volume identifier of the first logical volume and a logical volume identifier of the second logical volume described in the management information are made to be consistent with (are made to match) each other, and a data set identifier of the first logical volume and a data set identifier of the second logical volume described in the management information are made to be consistent with (are made to match) each other.

In the method of the present invention, the storage system generates a control program for performing a process for setting the logical volume identifier and the data set identifier for the first logical volume, which are described in the management information in the first logical volume, and the logical volume identifier and the data set identifier for the second logical volume, which are described in the management information in the second logical volume, to be different from each other.

Then, the storage system executes the control program after interrupting the duplication in order to make the second logical volume be recognized as being accessible by the operating system as a logical volume independent of the first logical volume.

Features and objects of the present invention other than the above will become clear by reading the description of the present specification with reference to the accompanying drawings.

BRIEF DESCRIPTION OF THE DRAWINGS

For complete understanding of the present invention and the advantages thereof, reference is now made to the following description taken in conjunction with the accompanying drawings in which:

FIG. 7 is a diagram showing an example of a control program when the secondary logical volume is to be recorded in a catalog different from that of the primary logical volume, in accordance with the embodiment of the present invention;

FIG. 8 is a diagram showing an example of a control program when the secondary logical volume is to be recorded in the same catalog as that of the primary logical volume, in accordance with the embodiment of the present invention;

FIG. 9 is a diagram showing an example of a control program when the secondary logical volume is to be recorded both in the same catalogs as those of the primary logical volume and in catalogs different from those of the primary logical volume, in accordance with the embodiment of the present invention;

DETAILED DESCRIPTION OF THE INVENTION

Overview

Figure 1:
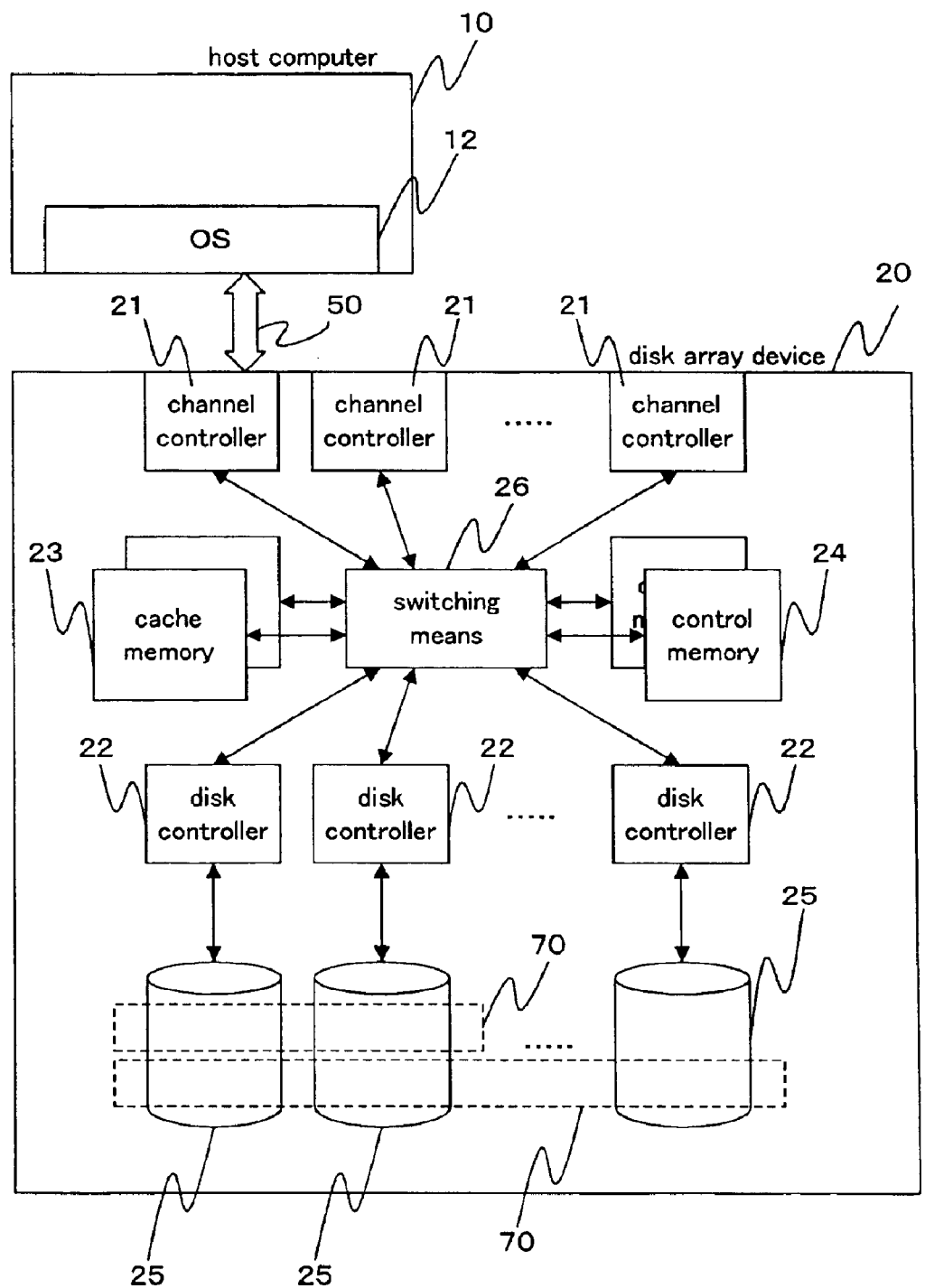
FIG. 1 is diagram illustrating a schematic configuration of a storage system according to an embodiment of the present invention.

At least following should be best understood by reading the description and from the accompanying drawings.

The present invention provides a method of controlling a storage system. The storage system includes: a host computer; and a storage control device that is connected to the host computer to be able to communicate therewith and that is for inputting/outputting data to/from a storage device based on a data input/output request sent from the host computer. The storage system: manages a storage area provided by the storage device using a logical volume that is a logical storage area created on the storage area; stores, in the logical volume, management information that enables an operating system running on the host computer to manage the logical volume; controls duplication of data in a first logical volume also to be stored on a real-time basis in a second logical volume that is different from the first logical volume; and makes a logical volume identifier and a data set identifier for the first logical volume that are described in the management information in the first logical volume and a logical volume identifier and a data set identifier for the second logical volume that are described in the management information in the second logical volume match each other while the real-time duplication is being performed. In the method, the storage system: generates a control program for performing a process for setting the logical volume identifier and the data set identifier for the first logical volume, which are described in the management information in the first logical volume, and the logical volume identifier and the data set identifier for the second logical volume, which are described in the management information in the second logical volume, to be different from each other; and executes the control program after interrupting the duplication in order to make the second logical volume be recognized as being accessible by the operating system as a logical volume independent of the first logical volume.

For example, the storage device may be a disk drive. The data input/output request may be a data write request and/or data read request. The logical volume identifier may be a logical volume name, a volume label, etc. The data set identifier may be a data set name, a file name, etc. The operating system may be an OS either of a mainframe or of an open system. The management information may be VTOC and/or VVDS.

In a storage system which is required to make consistent the logical volume identifier and the data set identifier described in the management information of the first logical volume with those of the second logical volume during real-time duplication, by generating a control program for performing a process for setting the logical volume identifier and the data set identifier for the first logical volume, which are described in the management information in the first logical volume, and the logical volume identifier and the data set identifier for the second logical volume, which are described in the management information in the second logical volume, to be different from each other, and by executing the control program, after interrupting the duplication, in order to make the second logical volume be recognized as being accessible by the operating system as a logical volume independent of the first logical volume, the user does not have to perform settings of the logical volume identifiers, the data set identifiers, etc. described in the management information every time it is necessary to access the second logical volume as a logical volume independent of the primary logical volume. Therefore, it is easy to make the secondary logical volume be recognized as accessible from the operating system as a logical volume independent of the primary logical volume. By the automatic operations performed by the control program, there will be fewer occurrences of human errors; therefore, the second logical volume may be readily and easily recognized as a volume independent of the first logical volume for the direct access such as data I/O.

Note that it is possible to include, in the above-described control program, a control program for interrupting the real-time duplication, and the interruption of the real-time duplication may be performed by executing this control program. By doing this, the second logical volume may be recognized more easily for direct access, such as for data I/O, as a volume separate from the first logical volume.

In addition, the operating system may manage the logical volumes by recording them in a catalog, and, when the second logical volume is being made to be recognized by the operating system as a logical volume independent of the first logical volume, the second logical volume may be recorded in a catalog different from that of the first logical volume or in the same catalog as that of the first logical volume. In this way, the second logical volume can be made to be recognized by the operating system as a volume separate from the first logical volume in a flexible manner corresponding to the user needs or operation strategy of the storage control device.

Further, when the second logical volume is being made to be recognized by the operating system as a logical volume independent of the first logical volume, the storage system may generate a control program for performing a process for setting the logical volume identifier and the data set identifier for the first logical volume, which are described in the management information in the first logical volume, and the logical volume identifier and the data set identifier for the second logical volume, which are described in the management information in the second logical volume, to be the same as each other and for restarting the real-time duplication, and the storage system may restart the real-time duplication by executing this control program. The real-time duplication may be readily and positively resumed when the second logical volume has been made to be recognized by the operating system as a separate volume independent of the first logical volume.

In addition, the second logical volume may be provided by a storage control device connected to the storage control device, to be able to communicate therewith, that provides the first logical volume. In this way, even in case in which a duplication of the data in the first logical volume provided by the storage control device installed at a local site is to be stored in the second logical volume of another storage control device, which is different from the above-described storage control device and installed at a remote site at a distance from that storage control device, the second logical volume may be recognized as a separate logical volume independent of the first logical volume.

Embodiments

An embodiment of a storage system according to the invention is shown in FIG. 1. A host computer 10 and a disk array device 20 are connected with each other via communication means 50 such as ESCON (registered trademark), a LAN (local area network), and a SAN (storage area network). The host computer 10 may be either a mainframe computer or an open system computer including personal computers and workstations. An OS 12 is running on the host computer 10.

The disk array device 20 has channel controllers 21, disk controllers 22, a cache memory 23, a control memory 24, and disk drives 25. The channel controllers 21, the disk controllers 22, the cache memory 23, and the control memory 24 are connected with each other through a switching means 26 such as a crossbar switch so that they can communicate. The channel controller 21 has a communication interface to the host computer 10 for controlling data transfer between the host computer 10 and the cache memory 23. The disk controller 22 controls data transfer between the cache memory 23 and the disk drive 25.

The cache memory 23 is accessible from both the channel controllers 21 and the disk controllers 22 and stores data input/output to/from the disk drives 25. The control memory 24 stores various kinds of information required for the operation of the disk array device 20 including the control information of the cache memory 23 and the disk drives 25. The control memory 24 is accessible from both the channel controllers 21 and the disk controllers 22.

The disk drives 25 may be controlled according to RAID (Redundant Array of Inexpensive [or Independent] Disks). The physical storage areas provided by the disk drives 25 are managed by using logical volumes 70, which are the logical storage areas created on the physical storage areas. In addition, in the storage system according to this embodiment, the duplication management function is made to work by being incorporated in the OS 12 or by executing a program that runs on the OS 12. In the "paired state," the contents of the primary logical volume 71 and the contents of the secondary logical volume 72 are controlled to ensure their consistency on a real-time basis, so that the contents of secondary logical volume 72 will be updated in real-time when the contents of primary logical volume 71 is updated. It should be noted that since the functionality of duplication management function itself is the same as that explained in the foregoing description, the description thereof is omitted here.

<Description of Processing>

Now the process for making the data in the secondary logical volume 72 capable of being accessed from the host computer 10 as a separated volume from the primary logical volume 71 will be described. (This process is referred to as the "process for rendering the data accessible" hereinbelow). The "process for rendering the data accessible" may be incorporated in the OS 12 (or performed by the OS 12) or may be realized by executing an application program running on the OS 12. In the following description, it is assumed that the "process for rendering the data accessible" is enabled by executing an application program. Also in the following description, it is assumed that the host computer 10 is a mainframe, and the OS 12 is an operating system for the mainframe.

The "process for rendering the data accessible" includes:

a first process performed before making the control states of both volumes 71, 72 change to the "split state";

a second process for making both the primary and secondary logical volumes 71, 72 change to the "split state" and setting the management information so that the secondary logical volume 72 can be accessed as a separate volume independent of the primary logical volume 71; and a third process for reconfiguring (re-setting) the management information so that the control states of both volumes 71, 72 can be changed from the "split state" back to the "paired state", and then actually making the control states of both the primary and secondary volumes 71, 72 change back from the "split state" to the "paired state".

First Process

Figure 2:
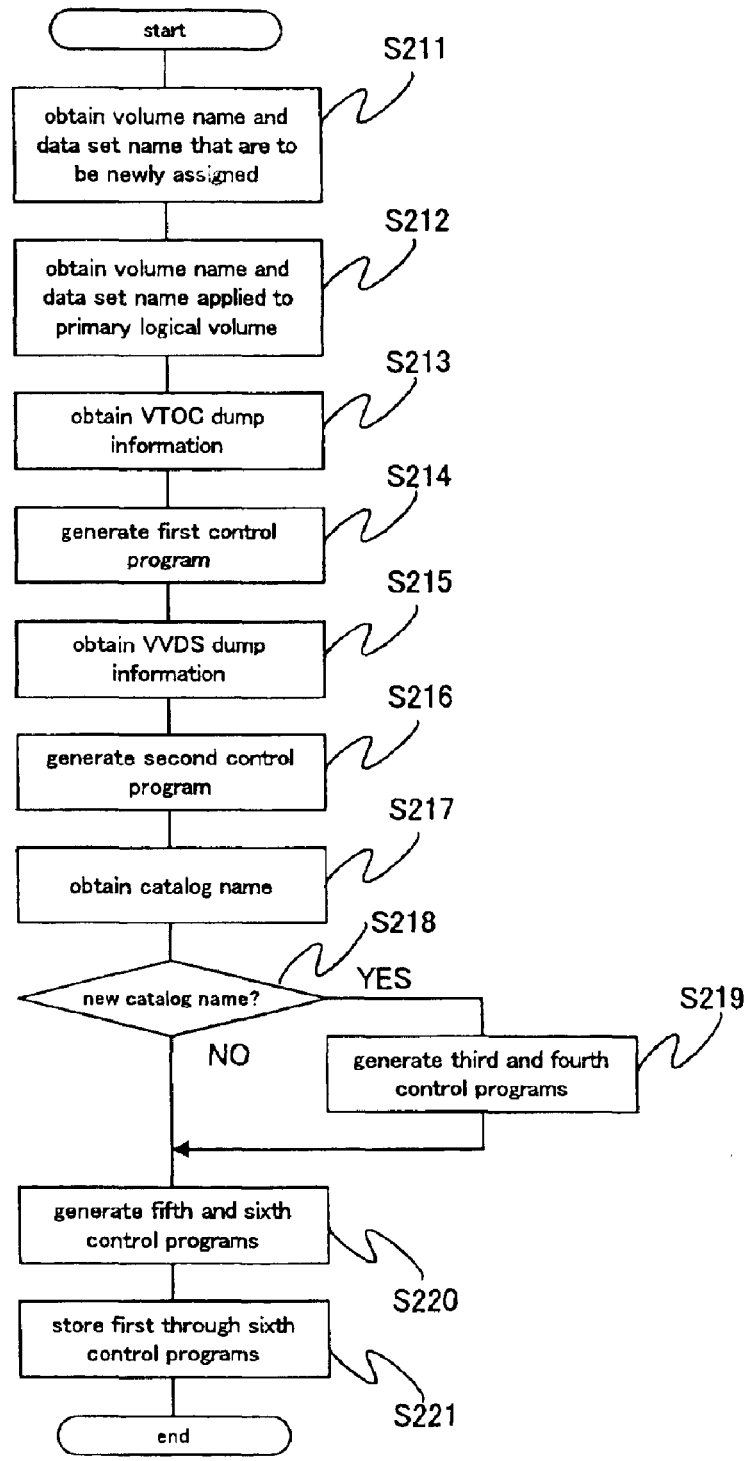
FIG. 2 is a flow chart illustrating a first process flow according to the embodiment of the present invention.

Referring to the flowchart shown in FIG. 2, the first process will be described. First, the application program obtains, from the user interface (not shown) of the host computer, a new volume name and a new data set name to be assigned to the secondary logical volume 72 that is to be rendered accessible independent of the primary logical volume 71 (S211). These names can be obtained from information stored in the memory (not shown) of the host computer 10 or in the disk drives 25, instead of obtaining them from the user interface.

Then, the application program obtains the volume name of the primary logical volume 71 and the data set name for the data set stored in the primary logical volume 71 from the catalog information (S212). The catalog information is the management information of the OS 12 and includes such information as physical addresses specifying the storage areas on the disk drives 25 and the attributes of the disk drives 25, which are associated with the data set name.

The catalog information is stored in a predetermined storage area in the logical volume 70. The user manages the data set in association with the catalog name. It should be noted that although in this embodiment the OS 12 is described to be one for a mainframe, if the OS 12 is for an open system, the catalog name may be the directory name, and the data set name may be the file name in a file system,.

Then, the application program loads dump information of VTOC stored in the primary logical volume 71 onto the memory or outputs the information to a data set (S213). The VTOC is management information managed for each logical volume and contains (1) the data set name, (2) the creation date, (3) the method in which the file was organized, (4) the record format, (5) the location at which the data set is stored, etc. When accessing a data set on a logical volume, the OS searches for the storage location of the VTOC (VTOC address) from the volume label to retrieve the storage location (extent address) of the target data set and uses the extent to access the data set.

Next, the application program generates a first control program (S214). The first control program is used to search, from the loaded or output dump list of VTOC, for the section in which the new volume name and the new data set name that have been obtained in step S211 are described, and then perform processes for setting the thus-found volume name and the data set name in the VTOC of the secondary logical volume 72 to the volume name and the data set name obtained in step S212.

Then, the application program loads onto the memory, or outputs into a data set, the dump information of VVDS stored in the primary logical volume 71 (S215). The VVDS is the information on the VSAM data set as described above and data sets subject to system management.

Then, the application program generates a second control program (S216). The second control program is used to search, from the loaded or output dump information of VVDS, for the section in which the new volume name and the new data set name that have been obtained in step S211 are described, and then perform processes for setting the thus-found volume name and the data set name in the VVDS to the volume name and the data set name obtained in step S212.

Then, the application program obtains the catalog name in which is recorded the secondary logical volume 72 to be made accessible from the host computer 10 as a volume independent from the primary logical volume 71 (S217). The catalog name may be obtained from the information stored in the memory or the disk drives 25, instead of obtaining it from the user interface. If the catalog name thus obtained here is a new catalog name (S218: YES), the application program generates a third control program for recording in the catalog information a new catalog corresponding to that catalog name, and a fourth control program for deleting the catalog from the catalog information (S219).

Then, the application program generates a fifth control program for recording the data set having the data set name obtained in step S212 in the catalog having the catalog name obtained in step S217, and a sixth control program for deleting the data set (S220).

Finally, the application program stores the first through sixth control programs generated as above into the memory of the host computer 10 or a given data set (S221).

Second Process

Figure 3:
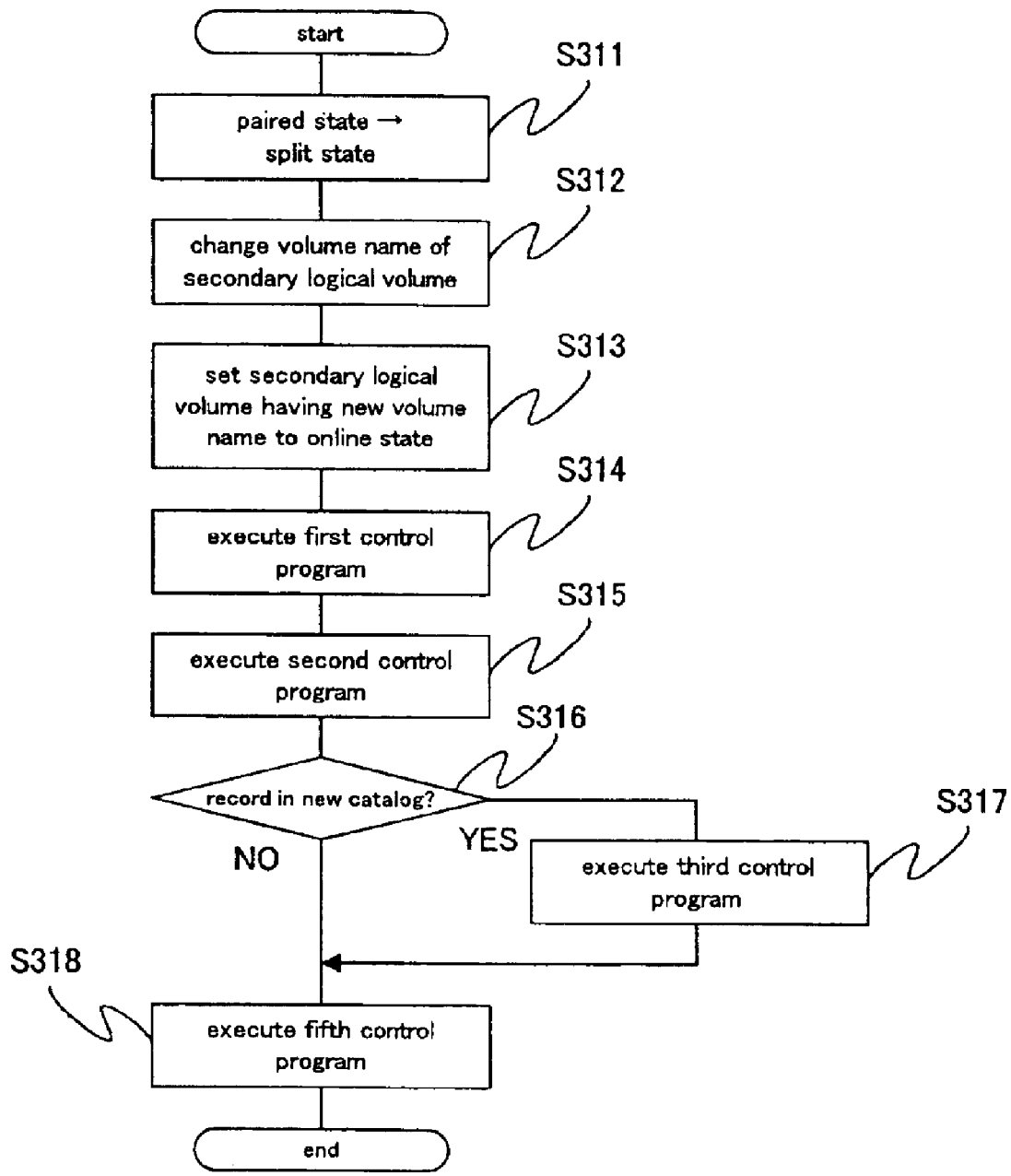
FIG. 3 is a flow chart illustrating a second process flow according to the embodiment of the present invention.

Now referring to the flowchart shown in FIG. 3, a second process will be described. At first, the application program sends a pair split command to the disk array device 20 to make the control state of the primary logical volume 71 and the secondary logical volume 72 change from the "paired state" to the "split state" (S311). Then, the application program sets the volume name (volume label) of the secondary logical volume 72 (S312) to the name newly obtained in step S212. The secondary logical volume 72 is set in an online state with the new volume name (S313).

Then the application program executes the first control program generated in step S214 to set the volume name and the data set name described in the VTOC of the secondary logical volume 72 to the new volume name and the new data set name (S314). In addition, it executes the second control program generated in step S216 to set the volume name and the data set name described in the VVDS of the secondary logical volume 72 to the new volume name and the new data set name (S315).

Then, if the application program is to record the secondary logical volume 72 in a new catalog (S316: YES), then it executes the third control program generated in step S219 to generate a new catalog with the new catalog name obtained in step S217. Then, the application program executes the fifth control program generated in step (S220) to record the data set of the secondary logical volume 72 with the new data set name in the catalog with the new catalog name obtained in step S217 (S318).

Figure 4:
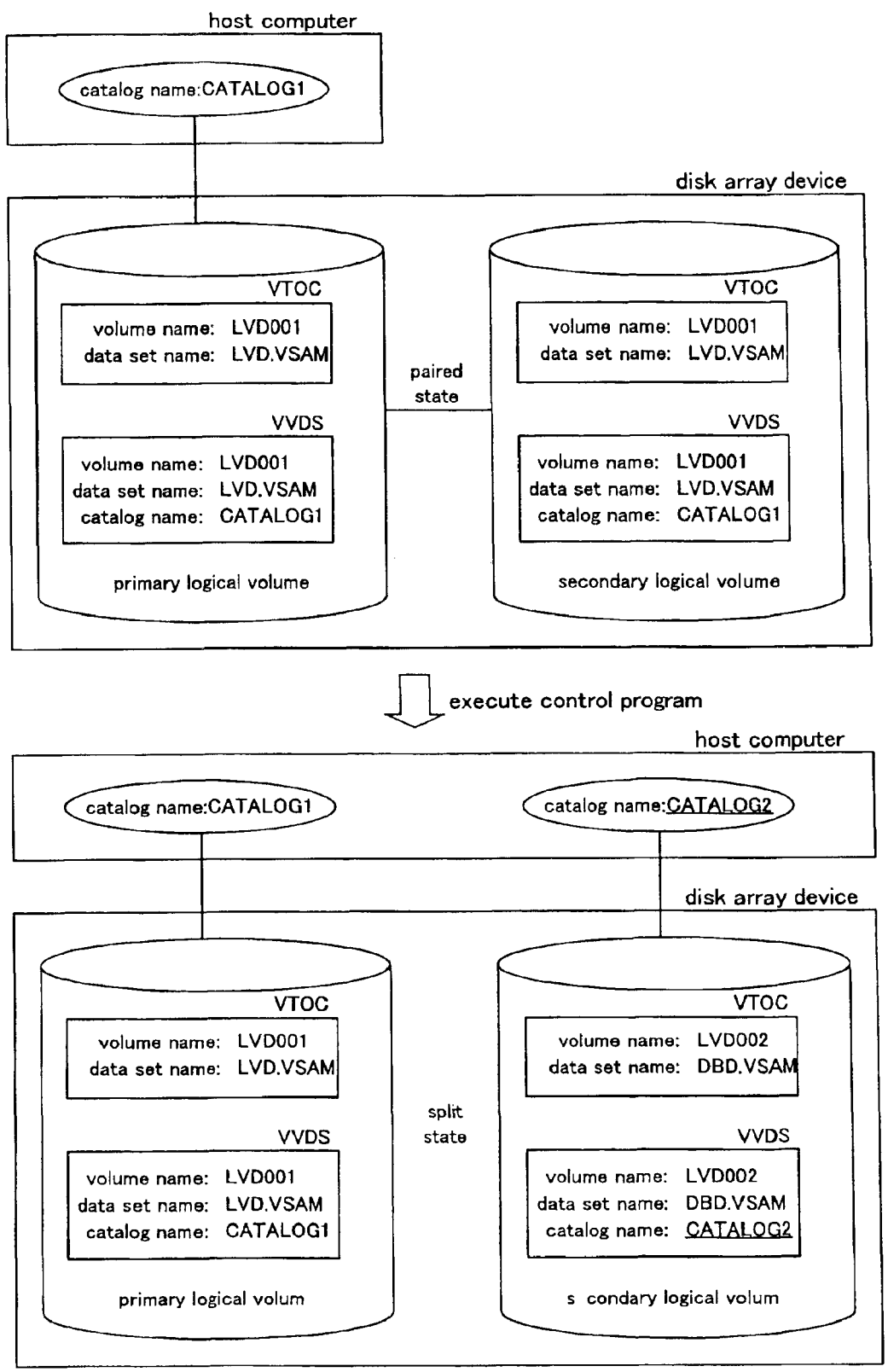
FIG. 4 is a schematic diagram illustrating states of the volume name, the data set name, and the catalog name when the secondary logical volume is recorded in a catalog different from that of the primary logical volume, in accordance with the embodiment of the present invention.
Figure 5:
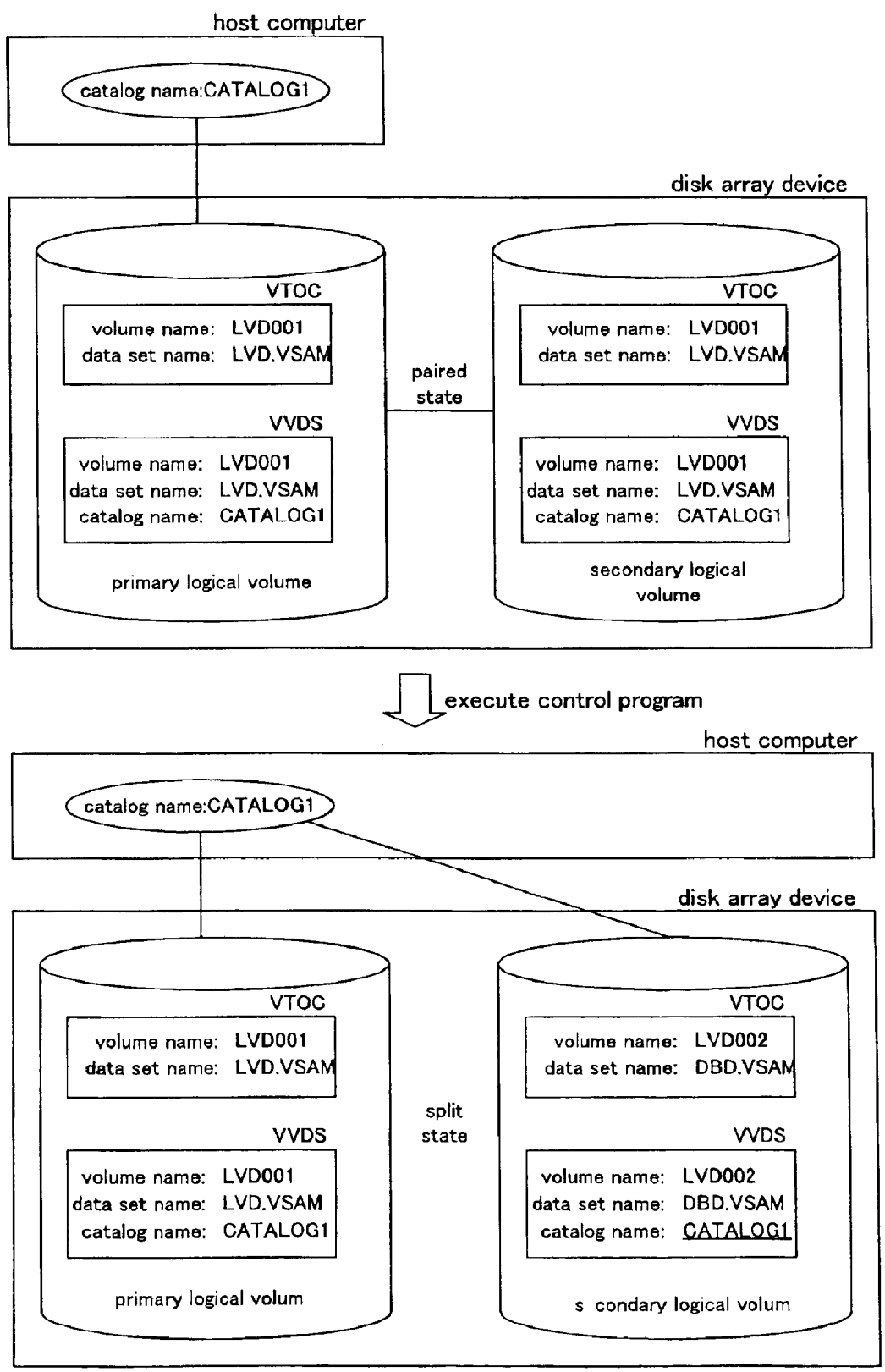
FIG. 5 is a schematic diagram illustrating states of the volume name, the data set name, and the catalog name when the secondary logical volume is recorded in the same catalog as that of the primary logical volume, in accordance with the embodiment of the present invention.
Figure 6:
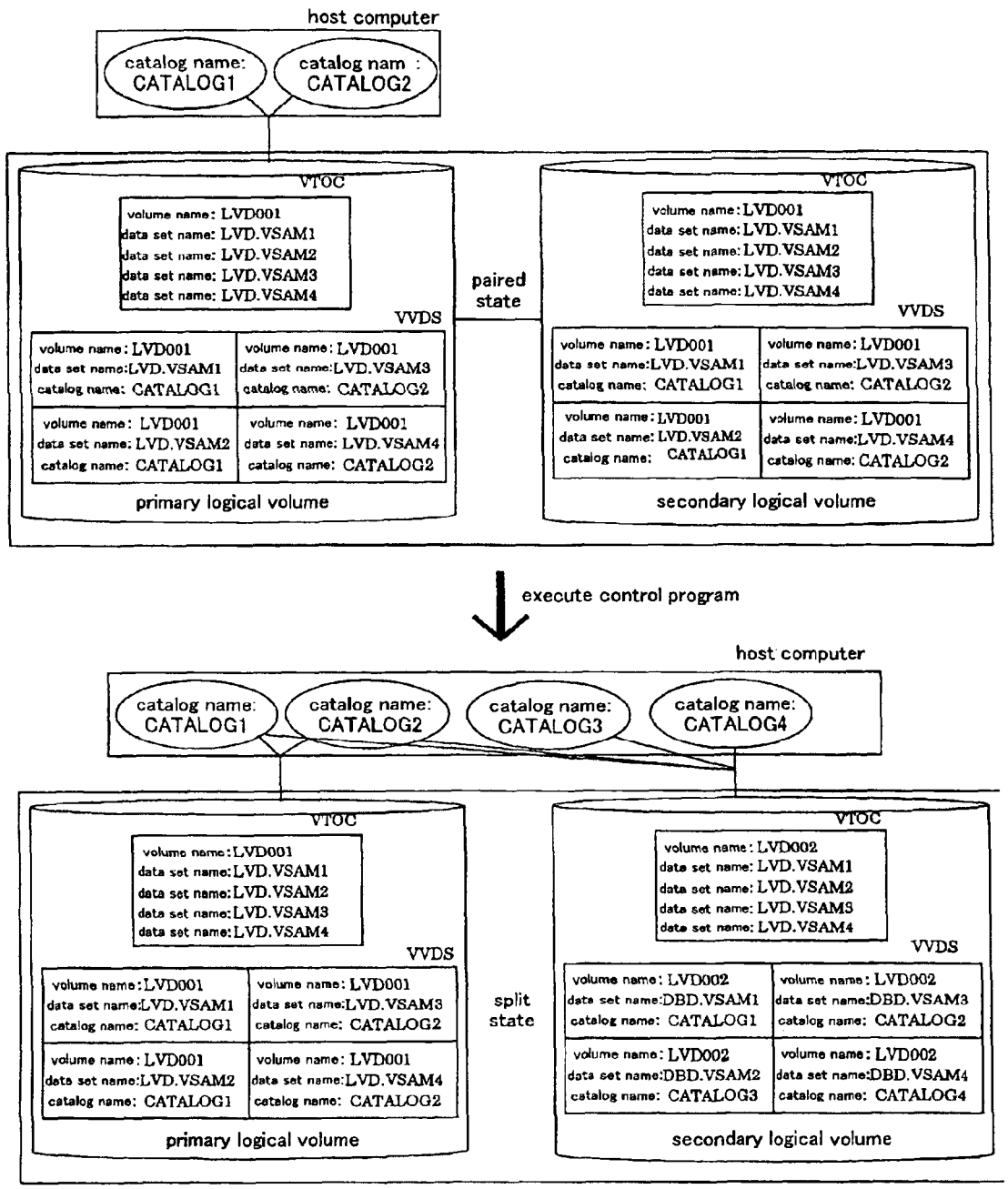
FIG. 6 is a schematic diagram illustrating states of the volume name, the data set name, and the catalog name when the secondary logical volume is recorded both in the same catalogs as those of the primary logical volume and in catalogs different from those of the primary logical volume, in accordance with the embodiment of the present invention.

FIG. 4 is a schematic diagram illustrating the states of the volume name, the data set name, and the catalog name when the secondary logical volume 72 is recorded in a catalog (CATALOG2) different from that (CATALOG1) of the primary logical volume 71. FIG. 5 is a schematic diagram illustrating the states of the volume name, the data set name, and the catalog name when the secondary logical volume 72 is recorded in the same catalog (CATALOG1) as that of the primary logical volume 71. FIG. 6 is a schematic diagram illustrating the states of the volume name, the data set name, and the catalog name when the secondary logical volume 72 is recorded both in the same catalogs (CATALOG1, CATALOG2) as those of the primary logical volume 71 and in catalogs (CATALOG3, CATALOG4) different from those of the primary logical volume 71.

FIG. 7 shows an example of a control program when the secondary logical volume 72 is to be recorded in a catalog different from that of the primary logical volume 71. FIG. 8 shows examples of the first, second, and fifth control programs when the secondary logical volume 72 is to be recorded in the same catalog as that of the primary logical volume 71. FIG. 9 shows an example of the first, second, fifth, and sixth control programs when the secondary logical volume 72 is to be recorded both in the same catalogs as those of the primary logical volume 71 and in catalogs different from those of the primary logical volume 71.

After the above processes, the OS 12 of the host computer 10 will be able to have access to the secondary logical volume 72 as a logical volume independent of the primary logical volume 71. Thus, the OS 12 as well as programs of the host computer 10 will be able to use, for example, the data in the secondary logical volume 72 for backup and/or to perform any batch processing and data analysis.

Third Process

Figure 10:
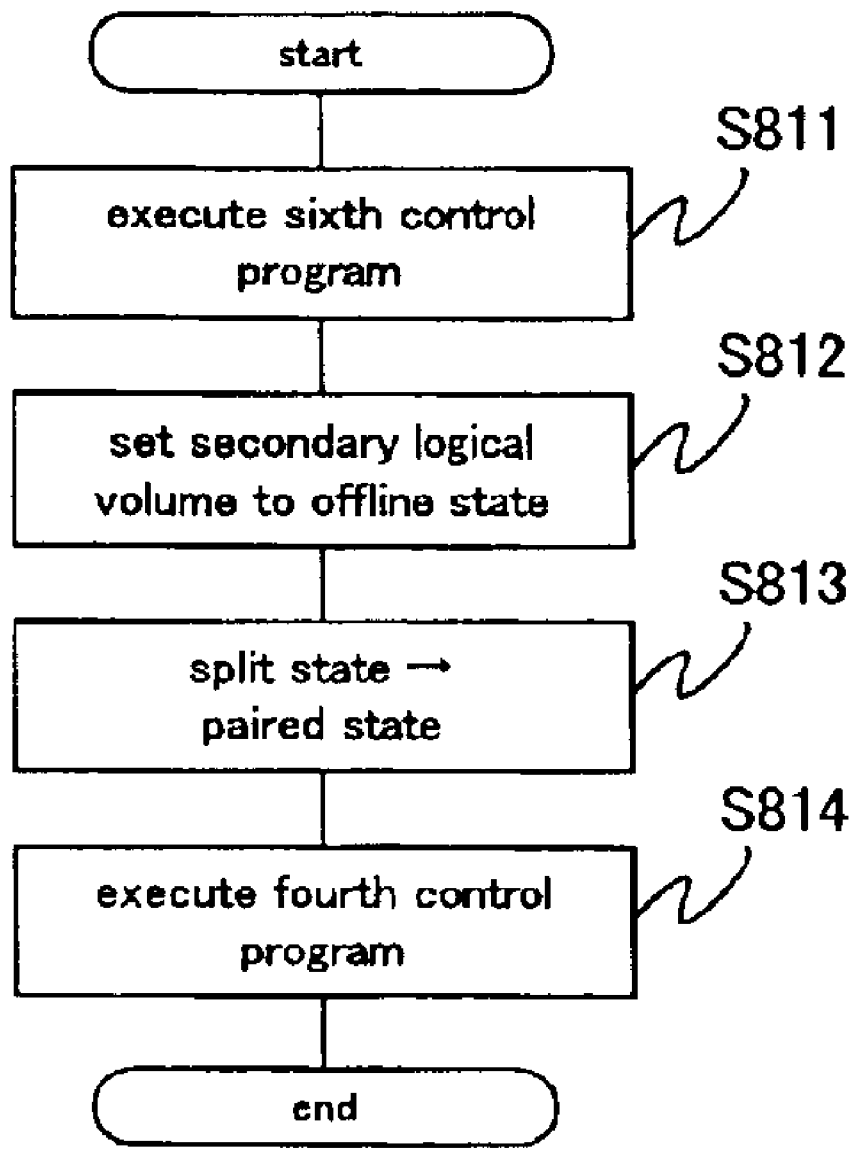
FIG. 10 is a flow chart illustrating a third process flow according to the embodiment of the present invention.
Figure 11A:
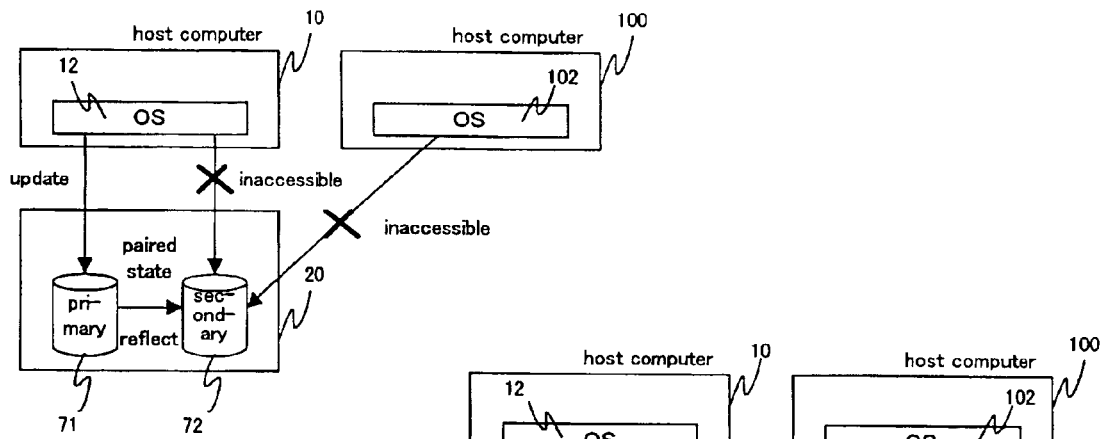
FIG. 11A through FIG. 11D are schematic diagrams illustrating a duplication management function of a storage system.
Figure 11B:
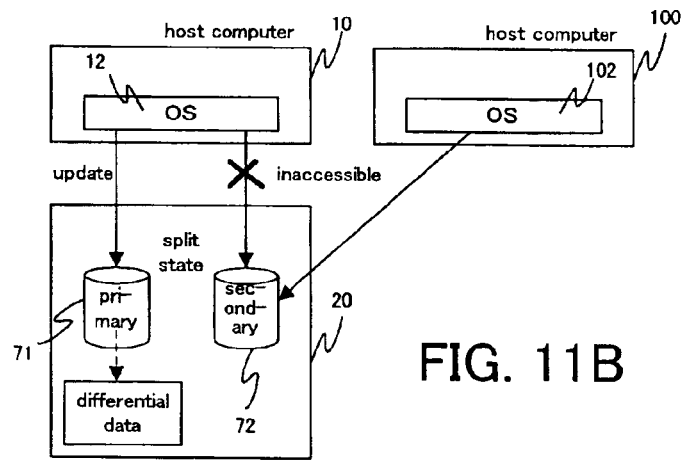
Figure 11C:
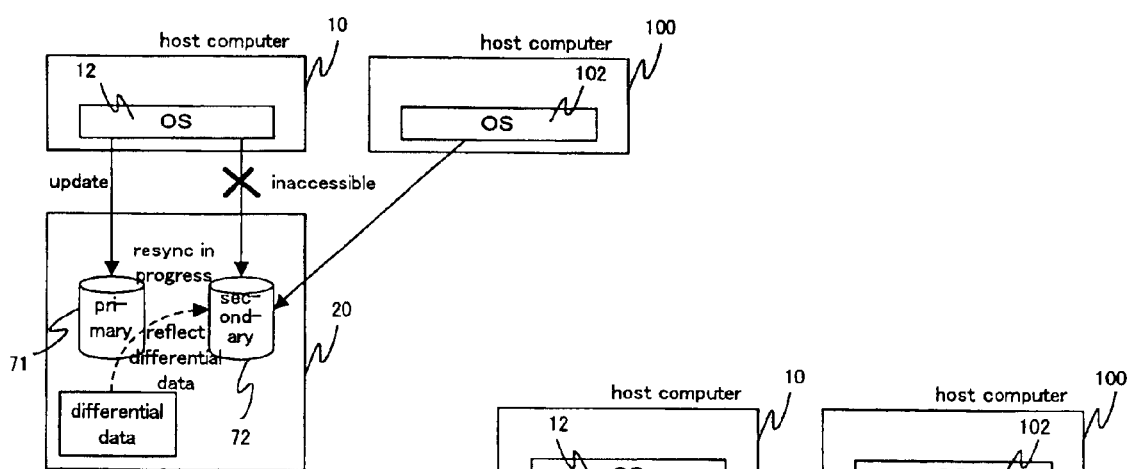
Figure 11D:
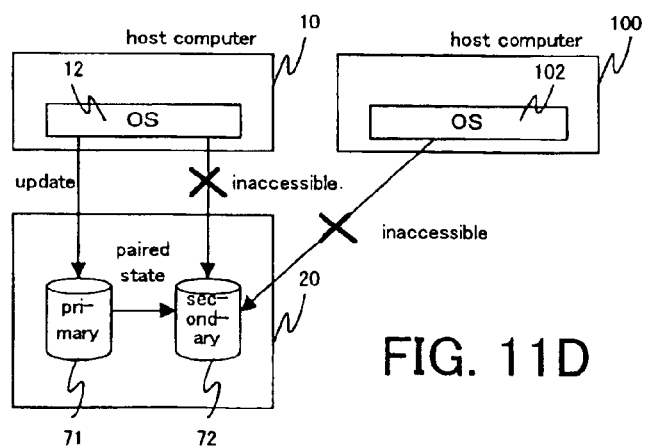

Now referring to the flowchart shown in FIG. 10, the third process will be described. At first, the application program will execute the sixth control program to delete the data set with the data set name obtained in step S212 from the catalog with the catalog name obtained in step S217 (S811). Then, the application program sets the secondary logical volume 72 in an offline state (S812). Then the application program sends a resync (resynchronization) command to the disk array device 20. In this way, the control state of the primary logical volume 71 and the secondary logical volume 72 is changed from the "split state" back to the "paired state" (S813).

As have been described above, the application program automatically generates the control programs for automatically setting the volume name and dataset name described in such management information as VTOC and VVDS to a new volume or a new data set name, and for recording and deleting a new catalog. Thus, the user does not have to perform settings of the contents of management information every time it is necessary in order to access the secondary logical volume 72 as a volume independent of the primary logical volume 71. As a result, the burden on the user to perform settings is significantly reduced.

Storing the first through sixth control programs thus generated in the above-described processes in a given data set makes it possible to reuse the stored data set in situations where, for example, operations such as regular data backup and daily batch processing are to be performed routinely or from time to time. This makes it possible to eliminate processes of setting the volume name and the data set name every time it is necessary to perform those jobs such as backup processing and batch processing. By making use of those control programs, it is easy to make the secondary logical volume 72 accessible from the OS 12 of the host computer 10 as a logical volume independent of the primary logical volume 71.

Although the control method of a storage system has been described in detail in accordance with an embodiment of the present invention, it should be understood that the foregoing description of the embodiment has been presented for purpose of facilitating understanding of the present invention and is not to limit the invention to the precise form disclosed. The present invention may be altered and/or modified without departing from the scope thereof, and it is without saying that equivalents of the present invention are included within its scope.

Other Embodiments

In the foregoing description, an embodiment having primary and secondary logical volumes 71, 72 managed by a single disk array device 20 has been presented. However, the present invention may be equally applicable to an embodiment in which a primary logical volume 71 and a secondary logical volume 72 are each provided by different disk array devices in separate housings. In such a case, the present invention can not only be applied to a case in which the disk array device 20 for providing the primary logical volume 71 and the disk array device 20 for providing the secondary logical volume 72 are placed close to each other such as in the same building, but also to a configuration in which the disk array devices are remotely located away from each other and connected through a communications line.

In addition, it is also possible to provide a mechanism for making a notification to a user through a user interface used for designating a volume name etc. to be set, in case the volume name or the data set name to be set is already used.

In brief, in accordance with the present invention, a novel control method of a storage system, a storage system, and a control program therefor may be provided.

Although the present invention has been described in conjunction with several preferred embodiments thereof, it should be understood that these embodiments are disclosed by way of examples and the present invention is not to be limited thereto. It should be recognized that many changes and modifications may be made by those skilled in the art without departing from the true spirit and the scope of the present invention set forth in the appended claims.

What is claimed is:

1. A method of controlling a storage system,
    said storage system including a host computer, and a storage control device that is connected to said host computer to be able to communicate therewith and that is for inputting/outputting data to/from a storage device based on a data input/output request sent from said host computer;
    said storage control device performing: a first control for managing a storage area in said storage device using a logical volume that is a logical storage area created on said storage area and storing, in said logical volume, management information that enables an operating system running on said host computer to manage said logical volume; a second control for controlling duplication of data in a first logical volume also to be stored on a real-time basis in a second logical volume that is different from said first logical volume; and a third control for making a logical volume identifier and a data set identifier for said first logical volume that are described in the management information in said first logical volume and a logical volume identifier and a data set identifier for said second logical volume that are described in the management information in said second logical volume match each other while said real-time duplication is being performed;

said method comprising:

said storage system generating a control program for performing a process for setting said logical volume identifier and said data set identifier for said first logical volume, which are described in said management information in said first logical volume, and said logical volume identifier and said data set identifier for said second logical volume, which are described in said management information in said second logical volume, to be different from each other; and said storage system interrupting said duplication and then executing said control program.

2. A method of controlling a storage system set forth in claim 1, wherein said control program includes a control program for interrupting said real-time duplication; and said interruption of said real-time duplication is performed by executing said control program.

3. A method of controlling a storage system set forth in claim 1, wherein said operating system manages said logical volumes by recording them in a catalog; and, when said second logical volume is being made to be recognized by said operating system as a logical volume independent of said first logical volume, said second logical volume is recorded in a catalog different from that of said first logical volume.

4. A method of controlling a storage system set forth in claim 1, wherein said operating system manages said logical volumes by recording them in a catalog; and, when said second logical volume is being made to be recognized by said operating system as a logical volume independent of said first logical volume, said second logical volume is recorded in the same catalog as that of said first logical volume.

5. A method of controlling a storage system set forth in claim 1, further comprising:

when said second logical volume is being made to be recognized by said operating system as a logical volume independent of said first logical volume, said storage system generates a control program for performing a process for setting said logical volume identifier and said data set identifier for said first logical volume, which are described in said management information in said first logical volume, and said logical volume identifier and said data set identifier for said second logical volume, which are described in said management information in said second logical volume, to be the same as each other and for restarting said real-time duplication; and said storage system restarts said real-time duplication by executing said control program.

6. A method of controlling a storage system set forth in claim 1, wherein said management information includes VTOC.

7. A method of controlling a storage system set forth in claim 1, wherein said management information includes management information about VSAM in case a data set is managed according to a VSAM format.

8. A method of controlling a storage system set forth in claim 1, wherein said second logical volume is provided by a storage control device connected to said storage control device, to be able to communicate therewith, that provides said first logical volume.

9. A storage system comprising:

a host computer; and a storage control device that is connected to said host computer to be able to communicate therewith and that is for inputting/outputting data to/from a storage device based on a data input/output request sent from said host computer, said storage system:

managing a storage area provided by said storage device using a logical volume that is a logical storage area created on said storage area;

storing, in said logical volume, management information that enables an operating system running on said host computer to manage said logical volume;

controlling duplication of data in a first logical volume also to be stored on a real-time basis in a second logical volume that is different from said first logical volume; and making a logical volume identifier and a data set identifier for said first logical volume that are described in the management information in said first logical volume and a logical volume identifier and a data set identifier for said second logical volume that are described in the management information in said second logical volume match each other while said real-time duplication is being performed;

said storage system further comprising:

means for generating a control program for performing a process for setting said logical volume identifier and said data set identifier for said first logical volume, which are described in said management information in said first logical volume, and said logical volume identifier and said data set identifier for said second logical volume, which are described in said management information in said second logical volume, to be different from each other; and means for executing said control program after interrupting said real-time duplication to make said second logical volume be recognized as being accessible by said operating system either as a logical volume independent of said first logical volume or as a data set independent of a data set within said primary logical volume.

10. A computer-readable storage medium having a program to be executed by a storage system recorded thereon, said storage system including: a host computer; and a storage control device that is connected to said host computer to be able to communicate therewith and that is for inputting/outputting data to/from a storage device based on a data input/output request sent from said host computer, and said storage system: managing a storage area provided by said storage device using a logical volume that is a logical storage area created on said storage area;

storing, in said logical volume, management information that enables an operating system running on said host computer to manage said logical volume; controlling duplication of data in a first logical volume also to be stored on a real-time basis in a second logical volume that is different from said first logical volume; and making a logical volume identifier and a data set identifier for said first logical volume that are described in the management information in said first logical volume and a logical volume identifier and a data set identifier for said second logical volume that are described in the management information in said second logical volume match each other while said real-time duplication is being performed;

said program comprising code for performing a process for setting said logical volume identifier and said data set identifier for said first logical volume, which are described in said management information in said first logical volume, and said logical volume identifier and said data set identifier for said second logical volume, which are described in said management information in said second logical volume, to be different from each other, after interrupting said duplication to make said second logical volume be recognized as being accessible by said operating system as a logical volume independent of said first logical volume.

* * * * *